3,039,930
PYRIDYL CARBAMYL LOWER ALKANE DERIVATIVES: ANALGESIC PROCESS
Allan Poe Gray, Decatur, Ill., assignor to Irwin, Neisler and Co., Decatur, Ill., a corporation of Illinois
No Drawing. Filed Apr. 6, 1960, Ser. No. 20,266
12 Claims. (Cl. 167—65)

This invention relates to a process for relieving pain, and is more especially concerned with a process for relieving pain in animals by the administration thereto of a pyridyl carbamyl lower alkane derivative.

This application is a continuation-in-part of my application Serial No. 771,737, filed November 4, 1958, now abandoned, entitled "Pyridyl Carbamyl Lower Alkane Derivatives and Processes."

The instant invention is bottomed on the unexpected finding that certain chemical compounds, hereinafter described, exhibit analgesic activity when administered to the animal organism. These compounds also exhibit muscle relaxant activity (which is not of a curare-like nature but which results from interneuronal blockade and is manifested as a relaxation of tensed muscle) which supplements their general analgesic activity and gives them a broader pharmacodynamic basis of providing relief from pain.

The compounds useful in the process of the present invention have a molecular structure in which there is attached to the same carbon atom of an N-substituted-carbamyl lower-alkane chain both a hydroxy radical or a lower-acyloxy group and at least one monocarbocyclic group; said carbon atom to which such groups are attached being separated by at least the carbonyl carbon atom of the carbamyl group from the carbamyl nitrogen atom; wherein one of the N-substituents is a pyridyl moiety joined to the carbamyl nitrogen atom through a ring carbon atom of the pyridyl ring; and, wherein the other N-substituent is a lower-alkyl group where the carbamyl nitrogen atom is di-substituted. The compounds useful in the process of the instant invention include the acid-addition salts of such substituted carbamyl lower-alkanes, the embodiments of such salts being functionally equivalent to the free bases and in fact constituting another pharmaceutically acceptable form of the compounds.

Definitions of terms:

The term "lower alkanes," as used herein, includes lower alkanes having 1 to 4 carbon atoms inclusive, as methane, ethane, propane, and butane, including both straight and branched-chain structural isomers thereof.

The term "lower-alkyl," as used herein, means alkyl groups having from 1 to 6 carbon atoms inclusive and is illustrated as by methyl, ethyl, n-propyl, isopropyl, et cetera.

The term "lower-acyloxy," as used herein, includes alkanoyloxy groups as formoxy, acetoxy, propionyloxy, butyryloxy; carbamyloxy; N-lower-alkyl-substituted carbamyloxy groups as N-methylcarbamyloxy, N-ethylcarbamyloxy, N-propylcarbamyloxy, N-butylcarbamyloxy; N,N-di-lower-alkyl substituted carbamyloxy groups as N,N - dimethylcarbamyloxy, N,N - diethylcarbamyloxy, N,N-dipropylcarbamyloxy, et cetera.

The term "monocarbocyclic group," as used herein, includes simple substituted and unsubstituted mono-cyclic-hydrocarbyl groups including aryl groups as phenyl, tolyl, lower alkoxyphenyl groups as p-methoxyphenyl; halogen-substituted phenyl groups as o-chloro-phenyl, p-bromo-phenyl; aralkyl groups as benzyl, beta phenylethyl, p-methylbenzyl; cycloalkyl groups as cyclohexyl, p-methyl-cyclo-hexyl; et cetera.

The term "pyridyl moiety," as used herein, means the unsubstituted pyridyl ring and such ring bearing one or more simple substituents which do not adversely affect the pharmacological properties of the compound such as a halogen atom, the methyl, methoxy, nitro, amino, trifluoromethyl, and other groups commonly used in the art as substituents on the pyridyl ring in preparing chemical compounds having varying pharmacological effects in animals. Such substituents can be introduced in any of the positions of the ring otherwise occupied by a hydrogen atom.

The pyridyl carbamyl alkane derivatives useful for the process of the invention can be prepared as follows: (1) reacting by heating a mono-carbocyclic-hydroxy-lower-alkanoic acid with an aminopyridine alone or in a solvent inert to the reactants to form the pyridyl carbamyl alkane derivative: (2) reacting a lower alkyl ester of a mono-carbocyclic-hydroxy-lower alkanoic acid with an aminopyridine to form the pyridyl carbamyl alkane derivative; and, (3) reacting a mono-carbocyclic lower-acyloxy-lower-alkanoyl chloride with an aminopyridine to form the pyridyl carbamyl alkane derivative.

The pharmaceutically acceptable non-toxic, acid addition salts of the above compounds can be prepared in conventional manner by reacting a pyridyl carbamyl alkane derivative, as set forth above, with the usual inorganic acids, as for example, hydrochloric, hydrobromic, hydriodic and sulfuric; or an organic acid as, for example, acetic, mucic, salicyclic, citric, et cetera.

To aid in an understanding of the free base compounds usable in the process of the invention, the pyridyl carbamyl alkane derivatives referred to above are illustrated by the following formula:

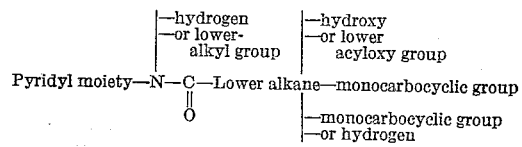

Examples 1 to 10 illustrate the preparation of the pyridyl carbamyl derivatives useful in the process of the invention.

EXAMPLE 1—2-MANDELAMIDOPYRIDINE AND SALT THEREOF

Fit a flask with a moisture trap. Place in the flask 18.8 grams (0.2 mole) of 2-aminopyridine, 30.4 grams (0.2 mole) of dl-mandelic acid and 120 milliliters of xylene to form a mixture. Place an oil-bath around the flask. Reflux the reaction mixture for 20 hours by maintaining the oil-bath temperature at 165–170 degrees centigrade. During the 20 hour period, 3.2 milliliters (90 percent yield) of water collects in the moisture trap and an orange solution forms in the reaction flask. Cool the orange solution in the flask to precipitate a thick oil which partially crystallizes. Dilute the mixture of precipitate and solution with benzene. Filter the mixture to separate 23.2 grams of bright yellow crystals, melting at 117–119 degrees centigrade, from the benzene-xylene mother liquor. Recrystallize these crystals from aqueous ethanol to produce 20.0 grams of long, flat, almost colorless needle-shaped crystals melting at 119.5–121 degrees centigrade. Extract the original benzene-xylene mother liquor with dilute aqueous acid. Make the separated aqueous portion alkaline and extract it with ether. Dry the separated ether portion. Remove the ether from the ether portion by distillation. The residue left after removal of the ether is an oil which crystallizes on standing. Recrystallize these crystals from aqueous ethanol to yield an additional 6.15 grams of product melting at 118–121 degrees centigrade. Add this portion of product to the original 20.0 gram portion to achieve a total yield of 26.1 grams of 2-mandelamido-pyridine (57 percent yield).

Analyze a portion of the product as follows:

*Analysis.*—Calculated: Nitrogen (basic) 6.14 percent by weight. Found: 6.05 percent by weight.

To one molar equivalent of the base 2-mandelamido-pyridine in ethanol add more than one molar equivalent of hydrogen chloride dissolved in ether. Recrystallize the resultant precipitate from a solvent mixture of methanol and ether to form colorless crystals of 2-mandelamido-pyridine hydrochloride, melting at 182–184 degrees centigrade.

Analyze a portion of the product as follows:

|  | Percent by weight | | |
|---|---|---|---|
|  | Carbon | Hydrogen | Ionic chlorine |
| Analysis: | | | |
| Calculated | 58.98 | 4.95 | 13.40 |
| Found | 59.23 | 4.90 | 13.14 |

EXAMPLE 2—2-BENZILAMIDOPYRIDINE AND SALT THEREOF

Dissolve 15.0 grams (0.16 mole) of 2-aminopyridine and 39.0 grams (0.16 mole) of methyl benzilate in 100 milliliters of dry xylene in a flask. Add 0.5 gram of metallic sodium. Fit an oil-bath around the reaction flask. Reflux the reaction mixture for 40 hours by maintaining the temperature of the oil-bath at 180–185 degrees centigrade. Cool the resultant solution and dilute it with benzene to precipitate a white solid. Recrystallize the white solid from isopropyl alcohol to yield 15.8 grams (32 percent yield) of product 2-benzilamidopyridine in the form of colorless needle-shaped crystals, melting at 215–216 degrees centigrade. Analyze a portion of the product as follows:

*Analysis.*—Nitrogen (basic) percent by weight. Calculated: 4.60. Found: 4.31.

To one molar equivalent of the base 2-benzilamidopyridine in ethanol, add more than one molar equivalent of hydrogen chloride dissolved in ether. Recrystallize the resultant precipitate from ethanol to yield 2-benzilamidopyridine hydrochloride having a melting point of 205 degrees centigrade. Analyze a portion of the hydrochloride salt as follows:

|  | Percent by weight | | |
|---|---|---|---|
|  | Carbon | Hydrogen | Ionic chlorine |
| Analysis: | | | |
| Calculated | 66.96 | 5.03 | 10.40 |
| Found | 67.41 | 5.09 | 10.35 |

EXAMPLE 3—4-(O-ACETYLMANDELAMIDO)-PYRIDINE

Mix, in a reaction flask, 25.0 grams (0.12 mole) of acetylmandelyl chloride, 11.1 grams (0.12 mole) of 4-aminopyridine and 25 grams (0.23 mole) of anhydrous sodium carbonate in 100 milliliters of benzene. Fit a steam-bath around the reaction flask. Heat the steam-bath to reflux the reaction mixture for 7 hours. Swirl the reaction mixture occasionally during this period. Cool the mixture and wash it with water. Separate the water layer from the benzene layer. Extract the water layer with fresh benzene. Separate the fresh benzene layer from the water layer. Combine the fresh benzene portion with the original benzene portion. Dry this combined benzene solution and concentrate it by distillation in vacuo to yield 17.0 grams (53 percent yield) of product, 4-(O-acetylmandelamido)-pyridine as a light yellow oil residue after distillation of the benzene from the solution. Cool the yellow oil to produce its solidification to a glass.

The following Table I illustrates the preparation of other pyridyl carbamyl alkane derivatives useful in the process of the invention. The procedure used is analogous to that employed in the foregoing example whose number is listed in the column entitled "Method" in Table I.

*Table I*

| Ex. | Compound | Melting range, degrees centigrade | Method | Carbon, percent by weight | | Hydrogen, percent by weight | | Ionic chlorine, percent by weight | | Basic nitrogen, percent by weight | |
|---|---|---|---|---|---|---|---|---|---|---|---|
|  |  |  |  | Calculated | Found | Calculated | Found | Calculated | Found | Calculated | Found |
| 4 | 2-mandelamido-4-picoline | 143–146 | 1 |  |  |  |  |  |  | 5.78 | 5.72 |
|  | Hydrochloride salt | 188–189 |  | 60.34 | 60.56 | 5.42 | 5.68 | 12.74 | 12.66 |  |  |
| 5 | 6-mandelamido-2-4-lutidine | 167–169 | 1 |  |  |  |  |  |  | 5.46 | 5.40 |
|  | Hydrochloride salt | 195–196 |  | 61.54 | 61.82 | 5.85 | 5.84 | 12.11 | 11.86 |  |  |
| 6 | 6-mandelamido-3-picoline | 141–142 | 1 |  |  |  |  |  |  | 5.78 | 5.62 |
|  | Hydrochloride salt | 203 |  | 60.34 | 60.57 | 5.42 | 5.32 | 12.74 | 12.15 |  |  |
| 7 | 2-mandelamido-5-chloropyridine | 146–148 | 1 |  |  |  |  |  |  | 5.33 | 4.98 |
|  | Hydrochloride salt | 169 |  | 52.20 | 52.07 | 4.04 | 4.14 | 11.85 | 11.81 |  |  |
| 8 | 2-mandelamido-5-bromo-pyridine | 155–156 | 1 |  |  |  |  |  |  | 4.56 | 4.36 |
|  | Hydrochloride salt |  |  | 45.43 | 45.79 | 3.52 | 3.43 | 10.32 | 9.94 |  |  |
| 9 | 2-(hexahydromandelamido)-pyridine | 118–129 | 1 |  |  |  |  |  |  | 5.98 | 6.06 |
| 10 | 2-(O-acetylmandelamido)-3,5-dibromopyridine | Oil | 3 |  |  |  |  |  |  |  |  |
| 11 | 2-mandelamido-6-aminopyridine hydrochloride | 201–202 |  | 55.82 | 56.27 | 5.04 | 5.15 | 12.67 | 12.54 |  |  |

Most of the compounds useful in the process of the present invention are novel, however some are old e.g., the compounds 2-amino-6-(acetyl-mandelamido)-pyridine and 2-amino-6-mandelamido-pyridine are disclosed in Lott et al., U.S. Patent 2,461,119 for uses unrelated to the instant analgesic process.

The compounds useful in the process of the present invention not only have analgesic properties, but also have muscle relaxant properties. The following pharmacological tests illustrate the general effectiveness of these compounds;

The following typical compounds useful in the analgesic process of the present invention were tested.

Compound name: Code letter
- 2-mandelamidopyridine hydrochloride _____ A
- 2-Mandelamido-4-picoline hydrochloride _____ B
- 6-mandelamido-3-picoline hydrochloride _____ C
- 6-mandelamido-2,4-lutidine hydrochloride _____ D
- 2-mandelamido-6-aminopyridine hydrochloride ___ E The above compounds were tested by the following test procedures:

*Interneuronal blockade—dogo.*—This type of activity (skeletal muscle relaxation) is evaluated by determining the effect of a compound on two reflexes, both of which require polysynaptic transmission of impulses. The reflexes used are the flexor (F.R. or hind leg twitch) and the linguomandibular (L.M. or jaw closure). Experimental preparations using both pentobarbital anesthetized and decerebrate dogs are employed. Also, the motor nerve is stimulated directly to be certain that any relaxation is not a result of blockade at the neuromuscular junction.

| Test conducted | | Results obtained with— | | | | |
|---|---|---|---|---|---|---|
| | | A | B | C | D | E |
| Acute toxicity, mice, $LD_{50}$, mg./kg | I.V | 133 | 66 | | | 325 |
| | I.P | 345 | 855 | 630 | 775 | |
| | P.O | 2,125 | >1,250 | | | |
| Inclined screen, $ED_{50}$, mg./kg., I.V | | 31 | 15 | | | |
| Analgesic, mice, percent increase in reaction time | I.V { 2.5 | 16 | 21 | 8 | | 22 |
| | 5 | 26 | 39 | 31 | 15 | 29 |
| | I.P { 10 | 30 | 40 | | | |
| | 20 | 35 | 62 | 35 | 20 | |
| | P.O { 10 | 25 | 39 | | | |
| | 20 | 31 | 35 | 33 | | |
| Analgesic, rabbits, percent increase in $R_{50}$ (5 mg./kg., I.V.) | { 30(?) | 0 | 15 | | | |
| | 90(?) | 13 | 9 | | | |
| | 150(?) | 5 | 0 | | | |
| Righting reflex, $PD_{50}$, mg./kg., I.P | | 100 | 150 | >200 | >400 | 150 |
| Interneuron. blockade, 0-4+(25 mg./kg., I.V.) | F.R | +++ | ++++ | ± | 0↑ | ++ |
| | L.M | ± | +++ | ++ | +++ | + |

EXPLANATION OF TEST PROCEDURES

*Acute toxicity—mice.*—The compounds are administered to groups of 5 mice in graded doses and the number of deaths recorded. The dose which should kill 50 percent of the animals is calculated using the method of Behrens and Kärber.

*Inclined screen—mice.*—Essentially the same as above except that instead of death the endpoint of this test is the inability of the animal to remain on an inclined screen.

*Analgesic—mice.*—The test is based on time of reaction to a stimulus produced by radiant heat employing the "Conduction Dolorimeter." The hind foot of the mouse is used as the test organ. Groups of 20 mice are treated with the test compound and their average reaction time to the stimulus is compared with that of control groups tested concurrently. The degree of analgesic activity is related to the percent increase in reaction time to the stimulus. (Evaluation of data from 60 groups of control mice showed that an average increase in reaction time of >14 percent would be highly significant—$P=<0.01$.)

*Analgesic—rabbits.*—This test is based on suppression of the response to pain resulting from electrical stimulation of the tooth pulp. The pain is produced by electrical shocks delivered through shielded spring electrodes which are inserted into holes drilled in each of the two upper teeth. The voltage is varied and when the stimulus reaches a painful intensity, the rabbit reacts by wiggling its nose and upper lip. Since all determinations are carried out in quadruplicate, it is possible to calculate an $R_{50}$ value ($R_{50}$=the voltage at which the rabbit responds to pain 50 percent of the time). Each animal is tested prior to, and at 30, 90 and 150 minutes after, administration of the drug. The degree of analgesic activity is based on the percent change between the pre and post treatment $R_{50}$ values.

*Righting reflex—mice.*—This test measures the ability of a compound to cause an animal to lose its righting reflex and can be an indication of either a music relaxant or sedative action. The compound is administered intraperitoneally in graded doses to groups of 5 mice and the results are expressed as $PD_{50}$ (the dose, mg./kg., which causes a loss of the righting reflex in 50 percent of the animals).

The explanation of the abbreviations used in the above table is as follows:

| Abbreviation: | Meaning |
|---|---|
| I.V | Intravenous. |
| I.P | Intraperitoneal. |
| P.O | Peroral. |
| F.R | Flexor reflex. |
| L.M | Linguo-mandibular reflex. |
| ↑ | Means stimulation rather than blockade. |
| Mg./kg | Milligrams per kilogram of body weight. |

While the compounds useful for the analgesic process of the present invention may be administered to the animal organism intravenously or intraperitoneally, it is contemplated that the preferred method of administration will be oral. For oral administration, they may be conveniently administered in the form of essentially pure undiluted compounds if desired, such as in a gelatin capsule. Preferably, for ease of handling the compounds will be used in intimate association with a pharmaceutical carrier, which may be either a liquid or a solid. When a liquid, it may form solutions or suspensions of the compounds. Flavoring substances may be included as desired. Sterile water is the preferred liquid carrier, since it readily dissolves the salt forms of the compounds. Solid pharmaceutical carrier such as starch, sugar, talc and the like may be used to form powders. Such powders may be tableted by the use of suitable lubricants such as magnesium stearate, binders such as gelatin and disintegrating agents like sodium bicarbonate in combination with citric or tartaric acid. The powders may also be used to fill gelatin capsules. The compounds useful in the analgesic process of the present invention may be formed in unit dosages containing predetermined amounts of the useful compounds which may then be administered one or more at a time at regular time intervals to create and maintain effective body levels of the useful compound. Suggested unit dosages for larger animals are 50 to 400 milligrams of useful compounds per tablet or capsule, or a solution of elixir containing 50 to 200 milligrams of useful compound per teaspoonful.

The compounds useful in the analgesic process of the instant invention may, if desired, be combined with other therapeutic agents used to treat conditions causing pain e.g. with conventional antirheumatic, anti-inflammatory and antipyretic agents such as anti-inflammatory steroids, salicylates, sedatives, antihistaminics, etc. The dosage of the therapeutic agent would be that normally used for the specific drug.

The invention can be embodied in other specific forms without departing from the spirit or essential characteristics thereof. The foregoing physical embodiments of my analgesic process are therefore to be considered in all respects illustrative and not restrictive, the scope of the invention being indicated by the appended claims rather than by the foregoing description, and all changes which come within the meaning and range of equivalency of the claims are therefore intended to be embraced therein.

I claim:

1. The process of producing analgesia in animals which comprises introducing into the animal organisms 50 to 400 milligrams of a pharmaceutically acceptable form of a compound selected from the group consisting of mono- and di-N-substituted carbamyl lower alkanes having attached to the same carbon atom of the alkane chain both a group selected from the class consisting of hydroxy, lower-alkanoyloxy, and carbamyloxy radicals, and at least one monocarbocyclic group; said carbon atom being separated by at least the carbonyl-carbon atom of the carbamyl group from the carbamyl nitrogen atom; wherein one of the N-substituents is a pyridyl moiety joined to the carbamyl nitrogen atom through a ring carbon atom of the pyridyl ring; and, wherein the other N-substituent is a lower-alkyl group where the carbamyl nitrogen is di-substituted.

2. The process of claim 1 wherein the N-substituted carbamyl alkane is 4-(O-acetylmandelamido)-pyridine.

3. The process of producing analgesia in animals which comprises orally introducing into the animal organism 50 to 400 milligrams of a pharmaceutically acceptable form of an N-substituted carbamyl lower alkane having attached to the same carbon atom of the alkane chain both a hydroxy radical and at least one mono-cyclic-hydrocarbyl group; said carbon atom being separated by at least the carbonyl-carbon atom of the carbamyl group from the carbamyl-nitrogen atom; and wherein the N-substituent is a pyridyl moiety joined to the carbamyl nitrogen atom through a ring-carbon atom of the pyridyl ring.

4. The process of producing analgesia in animals which comprises orally administering 50 to 400 milligrams of a pharmaceutically acceptable form of an N-substituted carbamyl methane having attached to the methane carbon atom both a hydroxy group and at least one monocyclic-hydrocarbyl group; wherein the N-substituent is a pyridyl moiety joined to the carbamyl nitrogen atom through a ring-carbon atom of the pyridyl ring, to said animal.

5. The process of claim 4 wherein the N-substituted carbamyl methane is 2-mandelamido-pyridine.

6. The process of claim 4 wherein the N-substituted carbamyl methane is 2-benzilamido-pyridine.

7. The process of claim 4 wherein the N-substituted carbamyl methane is 2-mandelamido-4-picoline.

8. The process of claim 4 wherein the N-substituted carbamyl methane is 6-mandelamido-2,4-lutidine.

9. The process of claim 4 wherein the N-substituted carbamyl methane is 2-mandelamido-5-chloropyridine.

10. The process of claim 4 wherein the N-substituted carbamyl methane is 2-(hexahydromandelamido)-pyridine.

11. The process of claim 4 wherein the N-substituted carbamyl methane is 6-mandelamido-3-picoline.

12. The process of claim 4 wherein the N-substituted carbamyl methane is 2-mandelamido-5-bromo-pyridine.

References Cited in the file of this patent

UNITED STATES PATENTS 2,914,533    Clinton et al. _____ Nov. 24, 1959

OTHER REFERENCES

Lott et al.: Chem. Abst., 43, p. 3853$^a$, 1949.